United States Patent [19]

Siedenstrang

[11] 3,959,545
[45] May 25, 1976

[54] UNVULCANIZED EXPANDED HIGH GREEN STRENGTH SYNTHETIC RUBBER PRODUCT AND METHOD OF MANUFACTURE

[75] Inventor: Roy W. Siedenstrang, Akron, Ohio

[73] Assignee: Phillips Petroleum Company, Bartlesville, Okla.

[22] Filed: Feb. 6, 1974

[21] Appl. No.: 440,168

[52] U.S. Cl. ............... 428/141; 260/2.5 HA; 260/32.6 A; 264/28; 264/54; 264/175; 264/237; 264/DIG. 5; 428/167; 428/310
[51] Int. Cl.² ............... B29D 7/14; B29D 27/00
[58] Field of Search ............... 264/28, 286, 48, 175, 264/236, 54, 45.5, 28, 237, DIG. 5; 260/32.6 A, 2.5 HA; 428/167, 141, 310

[56] References Cited
UNITED STATES PATENTS

| 2,635,293 | 4/1953 | Prance | 264/236 X |
| 2,642,626 | 6/1953 | Yurgen | 264/28 |
| 2,660,757 | 12/1953 | Smith et al. | 264/286 X |
| 3,194,864 | 7/1965 | Richie | 264/51 |
| 3,251,905 | 5/1966 | Zelinski | 260/32.6 A X |
| 3,317,363 | 5/1967 | Weber | 264/48 X |
| 3,328,503 | 6/1967 | Ancker | 264/175 |
| 3,658,978 | 4/1972 | Ancker | 264/175 |

FOREIGN PATENTS OR APPLICATIONS

| 955,959 | 4/1964 | United Kingdom | 264/54 |

Primary Examiner—Philip Anderson

[57] ABSTRACT

An expanded rubber, e.g., a foam or sponge-type material is obtained by admixing with a high green strength rubber an expanding or blowing agent, causing the agent to function and then quenching the expanding product to cool and set the same for example with cold water. Various applications of the process include cushioning material, rug underlay, shoe insole, slipper-type footwearing apparel, etc.

22 Claims, 1 Drawing Figure

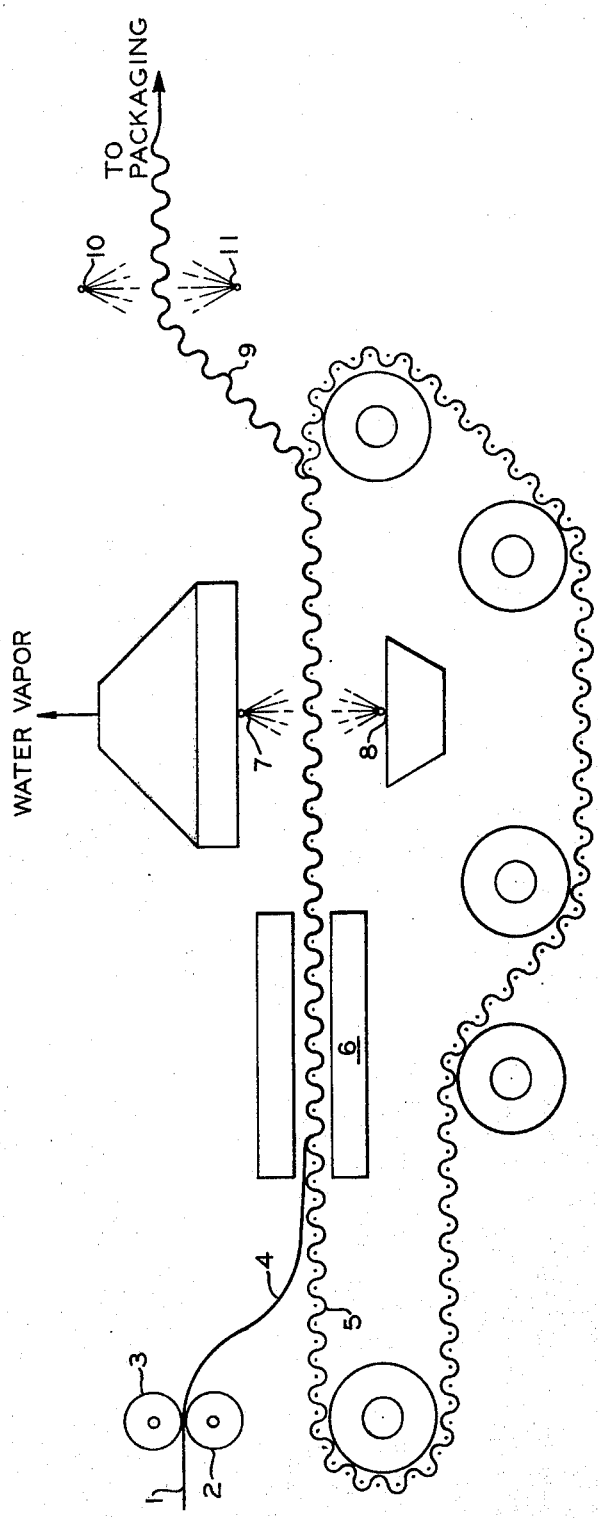

UNVULCANIZED EXPANDED HIGH GREEN STRENGTH SYNTHETIC RUBBER PRODUCT AND METHOD OF MANUFACTURE

This invention relates to a synthetic rubber containing product. In one of its aspects, the invention relates to a foam or sponge-type synthetic rubber product. In another of its aspects, the invention relates to a process for producing a foamed or sponge-type synthetic rubber product. In a specific aspect of the invention, it relates to the production of such a product from a high green strength rubber.

In one of its concepts, the invention provides a process for producing an expanded synthetic rubber product made by admixing a high green strength rubber with an expanding agent, causing the expanding agent to become operative to expand the rubber and then after suitable and desirable expansion have occurred quenching the expanding mass as with cold water. In another of its concepts, the invention provides a process for producing a product suitable as a rug underlay which comprises calendering to form into a thin sheet a high green strength synthetic rubber, as described herein, receiving the sheet upon a support, heating the screen upon the support for a time sufficient to activate the expanding agent, then when suitable expansion has occurred, quenching the sheet as with a cold water spray, preferably from both sides of the sheet. According to a further concept of the invention, there is provided a process for the production of sheeting, suitable as a rug underlay, which comprises admixing with a rubber as herein described and expanding or blowing agent, calendering the mixture into a relatively thin rubber sheet form, receiving the rubber sheet, preferably as produced, onto a moving screen wire, passing the screen wire and rubber sheet lying thereupon through a heater at a temperature to activate the blowing agent, e.g., 350°–400°F and then shortly after the blowing agent has been activated and expanded the rubber suitably and desirably quenching the sheet by applying a cold water spray thereto, preferably from both sides thereof.

High green strength rubbers, generally are those rubbers which when processed without a vulcanization or other chemically induced cure exhibit a tensile strength in excess of 2,500 psi (ASTM Method D412-61T). Among such rubbers are block copolymers of butadiene and styrene, both linear and radial, and block copolymers, both radial and linear, of styrene and isoprene. In order to have the required tensile strength of 2,500 psi, the block copolymers must have the configuration ABA where A is a block of polystyrene and B is a block of polybutadiene or polyisoprene. The radial copolymers will have three or more "A" blocks per "B" segment. It is the polystyrene blocks on the terminal ends of the polymer that appear responsible for the high green strength.

Normally rug underlay sponge and similar expanded rubber products are made by sulfur crosslinking. Thus, a thin sheet of a rubber compond including a vulcanizing agent such as sulfur is allowed to drape through a wire screen and expand it to a desired density by a heat activated blowing agent. A careful balance of blowing and vulcanizing agent is required to produce an adequate or desirable sponge.

I have conceived a process, and products thereby, whereby a superior material can be produced from a synthetic rubber. Related to a rug underlay in connection with which the invention is being described, a superior product can be produced using butadiene-styrene block copolymers for example as described in U.S. Pat. No. 3,251,905, May 15, 1966 to Rober P. Zelinski, by admixing such rubber with a blowing agent, without curing agent, activating the blowing agent when the rubber has been allowed to drape and blow in heat to the desired degree, and then quickly cooling the expanded rubber by spraying both top and bottom with cold water or dipping the same into a cold water bath to arrest the draping and expansion. Since such block copolymers or elastomers are thermoplastic in nature and do not thermally crosslink, all scrap compound can be reused, thus producing a no-waste product. Rug underlay sponge produced in the above manner has a high gloss, smooth surface, fine cell structure, very high tear resistance, high compression deflection and low room temperature set.

It is an object of this invention to produce a synthetic rubber product. It is another object of the invention to produce a foamed or expanded synthetic rubber product. It is a further object of this invention to produce a foamed or expanded sponge-like synthetic rubber product without use of a curing or vulcanizing agent. It is a further object of this invention to provide a method for producing expanded rubber products using high green strength rubber, without curing or vulcanizing agent, suitable for use as shoe insoles, slippers, rug underlay, etc. It is a further object of this invention to produce such a product having a high gloss, smooth surface, fine cell structure, very high tear resistance, high compression deflection and low room temperature set. It is a further object still to produce a product, as herein set forth and defined, from a radial block copolymer as herein described.

Other aspects, concepts, objects and the several advantages of the invention are apparent from the study of this disclosure and the appended claims.

According to the present invention, a high green strength rubber such as block copolymers produced from butadiene and styrene are admixed with a blowing or expanding agent, without vulcanizing agent, caused to expand to a desired extent and then quenched.

Also according to the invention, there is provided a process for making an expanded sheet-like product, for example a rug underlay, which comprises calendering the mixture of rubber and blowing agent to form a thin sheet, activating the blowing agent, and when a desired degree of expansion has taken place quickly chilling the expanding rubber to inactivate the blowing agent almost immediately in the surface or surfaces of the sheet.

According to the invention only those rubbers are used which have high green tensile strength and which do not require vulcanization or cross-linking in order to develop adequate properties in the final product. High green tensile strength butadiene/styrene rubbers such as radial block copolymers for example as described in U.S. Pat. No. 3,281,383 issued Oct. 25, 1966, Robert P. Zelinski and Henry L. Hsieh, can be used. The disclosures of the patents mentioned are incorporated by reference.

For the preparation of rubbers suitable for use according to the present invention the reader is referred to Examples I, IV, and IX of the U.S. Pat. No. 3,281,383.

The rubbers used in the test set out below were prepared according to the procedure of Example IV of U.S. Pat. No. 3,281,383 using n-butyl lithium as initiator, a small amount of tetrahydrofuran and silicon tetrachloride as the coupling agent in place of the epoxidized polybutadiene.

Linear block copolymers, ABA type, where A is a polystyrene block and B is a polybutadiene block, may be used. Radial block copolymers of butadiene-styrene which have a configuration of $(AB)_nX$ where A and B are polymer blocks of styrene and butadiene, respectively, $n \geq 3$, and X is the coupling agent, in the actual example, silicon tetrachloride are quite suitable for this purpose.

The rubbers which are presently preferred are chosen because it appears that the terminal styrene blocks bind the uncured polymer into a network similar to that obtained in block reinforced vulcanizates of random copolymers.

The butadiene to styrene ratio generally will vary from about 80/20 to about 60/40 parts by weight and the rubber will contain from 10 to about 40% of the styrene incorporated therein as terminal polystyrene blocks.

Referring now to the drawing a compounded stock, i.e., rubber and blowing agent which can contain some compounding oil, clay, carbonate or the like, is shown at 1 being passed through calendar rolls 2 and 3 from which a thin rubber sheet 4 emerges onto screen wire 5 which is continuous and which moves the rubber sheet through heater 6. The rubber which is thermoplastic as it becomes activated and drapes into the screen. As shown, it is quenched by sprays 7 and 8. The dimensionally stabilized rug underlay 9 is dried by air sprays 10 and 11 and passed to packaging, not shown for sake of simplicity of the drawing. Thus, the properly compounded raw block copolymer rubber sheet containing fillers, antioxidants, processing aids, pigments and a blowing agent (thickness 0.03–0.100 in.) is passed from the calendar rolls, onto a moving metal screen (conveyor belt) into a heating zone. The temperature in the zone is sufficiently high to soften the rubber and activate the blowing agent, i.e., about 350°–450°F.

The speed of the conveyor is adjusted so that during heating the desired amount of blowing and draping takes place. Draping is the sagging through the screen openings as the rubber softens and provides a patterned surface. Immediately following the heating zone is a quench zone which rapidly cools the now foamed sheet to stop the action of the blowing agent, slightly contract the sheet and bring it to its original solid state which will dimensionally stabilize the sheet. The quench is preferably water but refrigerated gas, including air, can be used. The cooling step can be carried out at room temperature or below, i.e. between about 35°–85°F. The quench is followed by a drying zone if water quench is used and the product is then ready for packaging.

It will be noted that the process does not include a step at elevated temperatures for vulcanization or crosslinking. The recipes given below do not contain any vulcanizing or crosslinking agents nor are they "built in" in the rubbers used.

Example

| | | |
|---|---|---|
| Butadiene | 60 | parts by weight |
| Styrene | 40 | parts by weight |
| Cyclohexane | 1000 | parts by weight |
| n-Butyl lithium | 2 | millimols/100 parts monomer |
| Tetrahydrofuran | 0.05 | millimols/100 parts monomer |

The above ingredients are polymerized sequentially with the styrene polymerized first after which 125% of the stoichiometric amount of silicon tetrachloride required for the reaction with the lithium terminated polymer is added, 60% immediately, 40% continuously in 10 minutes, and the reaction continued for two additional hours at 122°F. The solvent is steam stripped from the reaction mixture and the rubber recovered as crumb and dried.

The rubber[1] had the following properties:

| | |
|---|---|
| Butadiene/styrene ratio used | 60/40 by weight |
| % styrene incorporated | 40% " |
| % Block polystyrene | 40% " |
| cis % | 42 |
| trans % | 48 |
| vinyl % | 10 |
| Melt flow* | 1.0 |
| Density | 0.93 |

*ASTM 1238-65T at 180°C and 5 kg load (1) Solprene 475. Phillips Petroleum Company The rubber was compounded in recipes as shown below and sponge rubber sheet was prepared by passing a calendered sheet through a heating zone on a screen type conveyor as conventionally used in the trade, immediately quenching the sheet after expansion to set the sheet. The residence time, dimensions and properties of the finished product are given in the table below.

For comparison, a conventional sponge rubber sheet was prepared from a blend of solution polymerized random butadiene/styrene rubber (Solprene 1206, Phillips) 75/25 butadiene-styrene ratio and an oil extended 75/25 butadiene styrene solution polymerized random copolymer rubber (Solprene 375, Phillips Petroleum Company) in a conventional vulcanization recipe (Table II).

The results are summarized in the tables below:

Table I

| | Radial Block Copolymer in Rug Underlay Sponge | | | |
|---|---|---|---|---|
| | A | B | C | D |
| Radial Block Copolymer Rubber | 150 | 150 | 150 | 150 |
| Whiting - CaCO₃ (filler) | 100 | 200 | 300 | 400 |
| Naphthenic Extender Oil | | | | |
| Sunthene 380 Oil | 50 | 100 | 150 | 200 |
| Antioxidant -2,2 methylene | | | | |
| bis(4 methyl-6 tert butylphenol) | 1 | 1 | 1 | 1 |
| Processing aid Picco 6100 | | | | |
| Hydrocarbon resin | 15 | 15 | 15 | 15 |
| Blowing Agents | | | | |
| Azobisformamide Celogen AZ | 4 | 4 | 4 | 4 |
| 4,4' oxybis(benzenesulfonyl | | | | |
| hydrazide) Celogen OT | 4 | 4 | 4 | 4 |

Table I-continued

| | 324 | 474 | 624 | 774 |
|---|---|---|---|---|
| Calculated Specific Gravity | 1.192 | 1.300 | 1.365 | 1.408 |

All ingredients are based on parts by weight

Forming Temperature 400°F, Air Oven, Cold Water Quenched (50°F)

| | A | | B | | C | D | |
|---|---|---|---|---|---|---|---|
| Sample No. | 1 | 2 | 3 | 4 | 5 | 6 | 7 |
| Calendered Sheet Gauge, inch | .050 | .060 | .082 | .040 | .080 | .080 | .080 |
| Time to Drape and Blow, minutes | 1.50 | 1.66 | 2.25 | 1.00 | 1.83 | 1.42 | 1.25 |
| Blown Gauge, inch | .418 | .424 | .456 | .382 | .438 | | .398 |
| Weight, oz/sq yd | 43 | 56 | 73 | 44 | 76 | | 87 |
| 25% Compression Deflection, psi | 1.0 | 1.7 | 1.5 | 0.3 | 0.7 | | 0.3 |
| 50% Compression Set ASTM-B, 22 hours at 158°F | | | | | | | |
| % After 30 min. recovery | 100 | 100 | 100 | 100 | 100 | | 100 |
| % After 24 hours recovery | 100 | 100 | 100 | 100 | 100 | | 100 |
| 50% Compression Set, 22 hours at ambient temperature (72°F) | | | | | | | |
| % After 30 min. recovery | 19 | 23 | 20 | 11 | 14 | | 21 |
| % After 24 hours recovery | 2 | 8 | 9 | 5 | 5 | | 6 |

Observations

| | | | | | | | |
|---|---|---|---|---|---|---|---|
| Drape | Excellent | Fair | Fair | Excellent | Excellent | Fair | Excellent |
| Blow | Fair | Fair | Fair | Fair | Excellent | Fair | Fair |
| Surface Appearance | Rough | Rough | Rough | Smooth | Smooth | Smooth | Smooth |
| Cell Structure | Large | Fine | Large | Medium | Medium | Very Fine | Fine |
| Tear Resistance | Very High | Very High | Very High | Very High | Very High | Very High | Very High |

Table II

Typical Factory Cured Solution SBR Underlay (Control)

| | Parts by weight |
|---|---|
| Solution polymerized butadiene styrene rubber | 85 |
| Solution polymerized butadiene styrene rubber (oil extended) | 15 |
| Whiting - $CaCO_3$ | 220 |
| Naphthenic extender oil | 80 |
| Zinc Oxide | 4 |
| Oleic Acid | 10 |
| Diphenylamine/diisobutylene reaction product* (Antioxidant) | 1.5 |
| Activator - urea | 1 |
| Triethanolamine on inert carrier (processing aid) | 0.75 |
| $NaHCO_3$ blowing agent (70% oil dispersion) | 4 |
| Di-o-tolylguanidine | 1 |
| Zn - salt 2-mercaptobenzothiazole, stabilizer | 0.4 |
| Tetramethylthiuramdisulfide** | 3 |
| Sulfur | 3.75 |
| Benzidine Yellow (pigment) | 0.18 |
| | 429.58 |

*Agerite Stalite (R. T. Vanderbilt Co., Inc.)
**Methyl Tuad (R. T. Vanderbilt Co., Inc.) vulcanization accelerator

| | |
|---|---|
| Calculated Specific Gravity | 1.443 |
| Cure Time at 400°F, Minutes* | 2.85 |
| Calender Gauge, thickness | 0.060 |
| Blown Gauge, inch | 0.503 |
| Weight, oz/sq yd | 66 |
| 25% Compression Deflection, psi | 0.55 |
| 50% Compression Set, ASTM-B, 22 hours at 158°F % | 32 |
| 50% Compression Set, ASTM-B, 22 hours at 72°F - after 30 min. | est. 15 |
| Drape | Excellent |
| Blow | Excellent |
| Surface Appearance | Smooth |
| Cell Structure | Medium |
| Tear Resistance | Poor |

*Time required for blowing, draping and vulcanization

As indicated on the table, the residence time for the unvulcanized sheets of this invention, depending on the thickness of the original calendered sheet is 1 to 2.25 minutes. The time required for a vulcanized SBR sheet is 2.85 minutes for a sheet, originally 0.060 thick compared to 1.66 minutes for the unvulcanized sheet of the same gauge of this invention. This means a production rate almost double for the sheet of this invention obtained by elimination of the vulcanization step. The properties are good except for 50% compression set at 158°F which is above any temperature to which a rug underlay, for example, would be normally exposed. At room temperature and up to abot 110°F the compression set value is acceptable (less than 30). The tear strength of the sheet of this invention is outstanding compared to the conventional vulcanized product prepared from random butadiene rubbers, i.e., non-block copolymers. While not measurable quantitatively, the force, by hand, required to tear a sample is much higher than for the vulcanized SBR control. Of the recipes tested, B appears to be best in overall properties.

Reasonable variation and modification are possible within the scope of the foregoing disclosure, the drawing and the appended claims to the invention the essence of which is that a high green tensile strength rubber, e.g., a butadiene/styrene radial block copolymer is admixed with an expanding or blowing agent the blowing agent is activated and when the rubber has expanded to a desired extent the product thus produced is quenched.

I claim:

1. A process for producing a unvulcanized expanded foamed or sponge-like rubber product which at room temperature has properties that are competitive with vulcanized styrene-butadiene foamed or sponge-like products having similar levels of fillers and extenders comprising compounding into a synthetic rubber having a green tensile strength in excess of 2500 psi the desired amounts of fillers and extenders along with a sufficient amount of blowing agent to effect the desired degree of expansion, activating the blowing agent by heating, effecting a desired expansion of the mass and then quenching the mass to rapidly cool the same sufficiently to arrest the action of the blowing agent.

2. A process according to claim 1 wherein the compounded mass of rubber and blowing agent is calendered into sheet-like form, the blowing agent is activated by heating, and then when a desired expansion of the mass has been obtained the mass is quickly quenched.

3. A process according to claim 2 wherein the sheet-like form is placed upon a screen and there heated and allowed to drape and to expand desirably following which it is quenched.

4. A process according to claim 1 wherein the high green tensile strength rubber is a radial block copolymer derived from butadiene/styrene.

5. A process according to claim 1 wherein the quenching is effected with a spray of water.

6. A product produced by the process of claim 1.

7. A product produced by the process of claim 2.

8. A product produced by the process of claim 3.

9. A product produced by the process of claim 4.

10. A product produced by the process of claim 5.

11. The product of claim 6 wherein the high green strength rubber is a styrene-butadiene ABA-type block copolymer and the product consists essentially of the following ingredients in about the following proportions:

| Ingredients | Parts by weight |
|---|---|
| Block copolymer | 150 |
| $CACO_3$ filler | 100–400 |
| Naphthenic extender oil | Half that of the filler |
| Antioxidant | 1 |
| Hydrocarbon resin | 15 |
| Blowing agent | 8. |

12. The product of claim 11 wherein the block copolymer has a butadiene to styrene ratio of from about 80/20 to about 60/40 and from about 10 to about 40 percent of the styrene is in terminal blocks.

13. The product of claim 12 wherein the $CACO_3$ filler is present in the amount of about 200 parts by weight.

14. The product of claim 11 wherein the block copolymer is a radial block copolymer.

15. The product of claim 13 wherein the block copolymer is a radial block copolymer.

16. A product according to claim 7 wherein the synthetic rubber is a block copolymer.

17. A product according to claim 8 wherein the synthetic rubber is a radial block copolymer.

18. A foamed synthetic rubber composition in which essentially all of the rubber is an unvulcanized synthetic rubber which has a green strength in its unfoamed state in excess of 2500 psi (ASTM Method D412-61T).

19. A product according to claim 18 wherein the foamed synthetic rubber is a foamed block copolymer.

20. A product according to claim 19 wherein the foamed synthetic rubber is foamed ABA-type block copolymer.

21. A product according to claim 20 wherein the foamed synthetic rubber is a sheet having a textured surface or protuberances on at least one surface.

22. A sponge-like rubber sheet having a textured surface or protuberances on at least one surface prepared according to the process of claim 3.

* * * * *